(12) United States Patent
Merugu et al.

(10) Patent No.: US 7,895,149 B2
(45) Date of Patent: Feb. 22, 2011

(54) SYSTEM FOR OPINION RECONCILIATION

(75) Inventors: Srujana Merugu, Sunnyvale, CA (US);
Philip L. Bohannon, Cupertino, CA (US); Ashwin Kumar V Machanavajjhala, Ithaca, NY (US); Pedro DeRose, Madison, WI (US)

(73) Assignee: Yahoo! Inc., Sunnyvale, CA (US)

( * ) Notice: Subject to any disclaimer, the term of this patent is extended or adjusted under 35 U.S.C. 154(b) by 714 days.

(21) Appl. No.: 11/957,779

(22) Filed: Dec. 17, 2007

(65) Prior Publication Data

US 2009/0157589 A1  Jun. 18, 2009

(51) Int. Cl.
*G06N 5/00* (2006.01)
(52) U.S. Cl. .......................................... 706/56; 706/45
(58) Field of Classification Search .................. 706/56, 706/45
See application file for complete search history.

(56) References Cited

U.S. PATENT DOCUMENTS 7,130,777 B2  10/2006  Garg et al. ...................... 703/2
7,827,183 B2 * 11/2010  Fraser et al. .................. 707/748

OTHER PUBLICATIONS

Banerjee, Protima, Language Modeling Approaches to Question Answering, Thesis, Doctor of Philosophy, Drexel University, Jul. 2009, 1-219.*
Jordan, Michael I., "*Graphical Models*," Computer Science Division and Department of Statistics, University of California, Berkeley, Nov. 8, 2003, pp. 1-35.
Hofmann, Thomas, "*Latent Semantic Models for Collaborative Filtering*," ACM Transactions on Information Systems, vol. 22, No. 1 Jan. 2004, pp. 89-115., [online] http://mainline.brynmawr.edu/Courses/cs380/fall2006/p89-hofmann.pdf.
Marlin, Ben, "*Collaborative Filtering: A Machine Learning Perspective*," MS Thesis, (2004), 137 pgs., [online], http://www.cs.toronto.edu/~marlin/research/thesis/cfmlp.pdf.
Mui, Lik, "*Computational Models of Trust and Reputation: Agents, Evolutionary Games, and Social Networks*," Ph.D. Thesis, Dec. 20, 2002, 139 pgs. http://groups.csail.mit.edu/medg/ftp/lmui/computational%20models%20of%20trust%20and%20reputation.pdf.
Resnick, Paul et al. "*GroupLens: An Open Architecture for Collaborative Filtering of Netnews*," Proceedings of ACM 1994 Conference on Computer Supported Cooperative, (1994), pp. 175-186.

* cited by examiner

*Primary Examiner*—Wilbert L Starks, Jr.
(74) *Attorney, Agent, or Firm*—Brinks Hofer Gilson & Lione

(57) ABSTRACT

A system is disclosed for reconciling opinions generated by agents with respect to one or more predicates. The disclosed system may use observed variables and a probabilistic model including latent parameters to estimate a truth score associated with each of the predicates. The truth score, as well as one or more of the latent parameters of the probabilistic model, may be estimated based on the observed variables. The truth score generated by the disclosed system may enable publishers to reliably represent the truth of a predicate to interested users.

25 Claims, 6 Drawing Sheets

SYSTEM FOR OPINION RECONCILIATION

BACKGROUND

1. Technical Field

The present description relates generally to on-line communities and, more particularly, but not exclusively, to reconciling agent generated opinions in on-line communities.

2. Related Art

The availability of powerful tools for developing and distributing Internet content has led to an increase in information, products, and services offered through the Internet, as well as a dramatic growth in the number and types of consumers using the Internet. With this increased consumer traffic, the number of community driven systems provided through the Internet, such as rating systems, collaborative information resources and databases, or other information resources, has also grown dramatically.

On-line collaborative communities and rating systems, such as Yahoo! Answers, Yahoo! Movies, Wikipedia, and other information resources may receive, process, and/or publish agent generated opinions and other generated information about topics and predicates of interest. Systems that aggregate agent generated opinions associated with a common predicate may provide useful and convenient information to users.

However, the collaborative communities, rating systems, and other community driven systems must often aggregate differing, conflicting, and/or ambiguous opinions. In addition, some ratings systems may be susceptible to tampering, or may be skewed by user bias. The differences, conflicts, and/or ambiguities should be reconciled to provide a more reliable aggregate of opinion generation parameters. The reconciliation of the opinions should also account for biases in agents and the potential for tampering.

BRIEF SUMMARY

A system is disclosed for reconciling opinions generated by agents with respect to one or more predicates. The disclosed system may use observed variables and a probabilistic model including latent parameters to estimate a truth score associated with each of the predicates. The truth score, as well as one or more of the latent parameters of the probabilistic model, may be estimated based on the observed variables. The truth score generated by the disclosed system may enable publishers to reliably represent the truth of a predicate to interested users.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

Non-limiting and non-exhaustive descriptions are provided with reference to the following figures. The components in the figures are not necessarily to scale, with an emphasis instead being placed upon illustrating the principles of the invention. Moreover, in the figures, like-referenced numerals designate corresponding parts throughout the different views.

DETAILED DESCRIPTION

A system and method, generally referred to as a system, relate generally to opinion reconciliation based on a probabilistic model. The principles described herein may be embodied in many different forms. The disclosed systems and methods may allow publishers to provide users with a reliable aggregate opinion or truth score associated with a predicate. The disclosed systems and methods may also allow publishers to identify trustworthy and reliable users. For the sake of explanation, the system is described as used in a network environment, but the system may also operate outside of the network environment.

Figure 1:
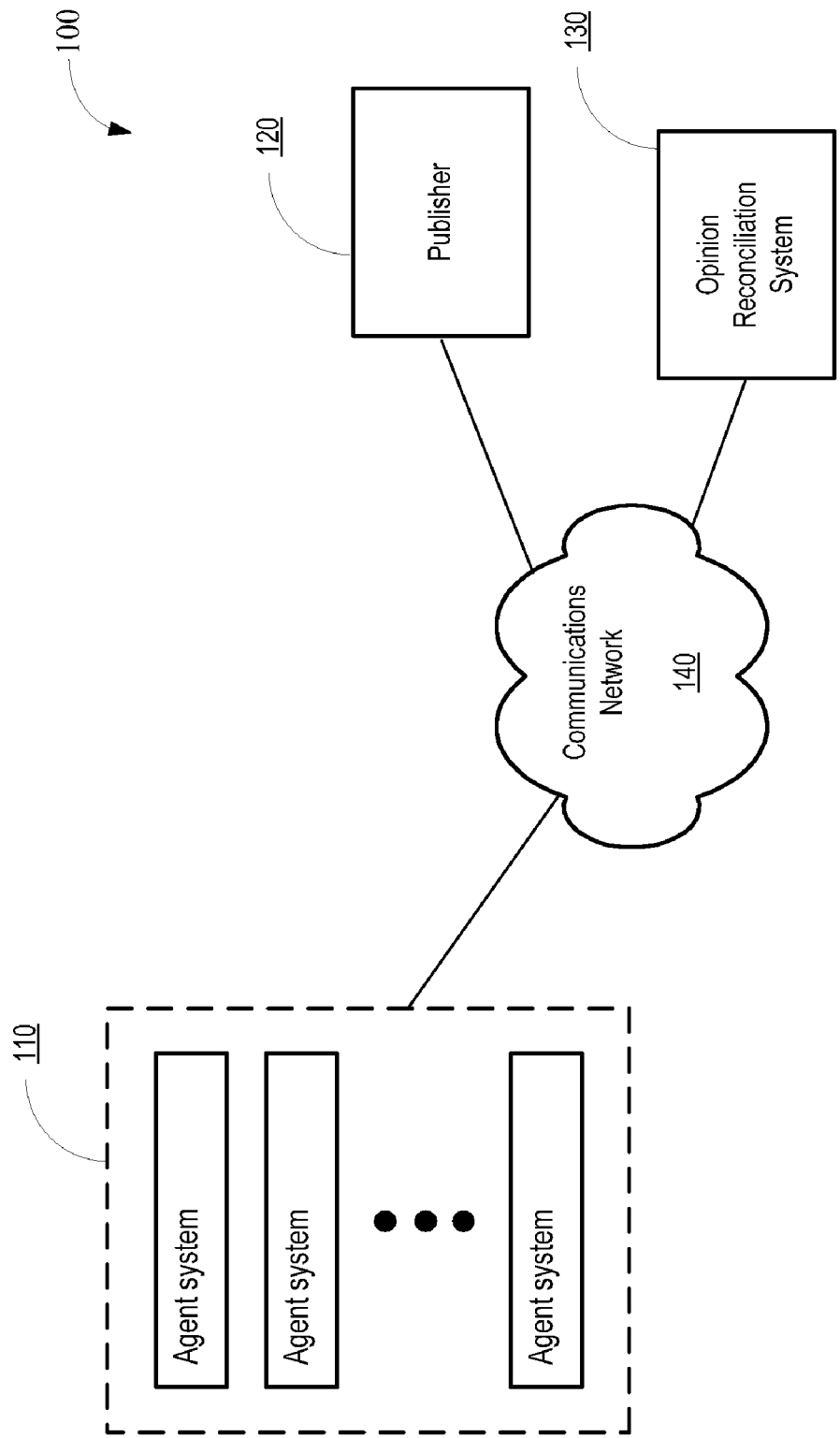
FIG. 1 shows a general architecture of a system for opinion reconciliation.

FIG. 1 shows a general architecture 100 of a system for opinion reconciliation. The architecture 100 may include agent systems 110, a publisher 120, and an opinion reconciliation system 130. The publisher 120 may host one or more predicates related to one or more topics, such as on a Web page. For example, a publisher may host predicates relating to how good a movie or book is, which candidate in an upcoming election would do the best job, which sports team has the best chance to win a championship, or other topics about which an agent may express an opinion. The predicates may be generated by one or more of the agents systems 110, by the publisher 120, or by an external source. The predicates may also be extracted from other sources, such as from Web-sites or search engines, using a data extraction system. The publisher 120 may be an on-line database, a web community, or other community driven information resource.

The agent systems 110 may generate an opinion associated with one or more of the predicates hosted by the publisher 120. The publisher 120 may also host the opinions generated by the agents systems 110. An opinion submitted by the agent system 110 may represent the agent's belief, judgment, opinion, rating, or other conclusion in regards to the predicate. For example, the opinion may be a user's rating of a movie, such as a numerical value between one (1) and ten (10), a grade between F and A+, a "Yes" or "No", or other mechanism by which a user may express an opinion about a movie or other topic. The opinion may be selected from a pre-defined set of categories, such as "approve", "indifferent," or "disapprove" when opining on a political candidate's foreign policy positions.

In some systems, an agent, or an opinion generated by one of the agent systems 110, may also be a predicate, such as on Web pages that enable an agent to rate another agent, or rate another agent's opinion. In other systems, the predicate and the opinion may be generated by the agent. For example, community sites such as Yahoo! Answers enable users to generate both the question and the answers, as well as to rate other users' questions and answers. The opinion reconciliation system 130 may be configured to generate a truth score associated with the user ratings of the questions and/or of the answers. In a question/answer context such as in Yahoo! Answers, the predicate may include the question and/or the answer; and the opinion reconciliation system 130 may provide reliable and accurate insight into a determination of the usefulness of a question, the relevance of an answer to the question, and/or the trustworthiness of a user for posing or answering questions.

The agent system 110 may connect to the publisher 120 via the Internet using a standard browser application. A browser-based implementation allows system features to be accessible, regardless of the underlying platform of the agent system 110. The agent system 110 may be a desktop, laptop, handheld computer, cell phone, mobile messaging device, network enabled television, digital video recorder, such as TIVO, automobile, or other network enabled user client system 110, which may use a variety of hardware and/or software packages. The agent systems 110 may connect to the publisher 120 using a stand-alone application (e.g., a browser via the Internet, a mobile device via a wireless network, or other applications) which may be platform-dependent or platform-independent. Other methods may be used to implement the agent systems 110.

One or more of the agent systems 110 may be an information extraction agent. An extraction agent may employ one or more Hidden Markov Models, Support Vector Machines, Condition Random Fields, or other extraction mechanisms to extract information from Web sites, search engines, or other information sources. The information extracted by the extraction agent may include predicates associated with various kinds of named entities such as persons, places and organizations. Such predicates may include statements about the attributes of a named entity, such as the gender of a person. Predicates associated with named entities may also include relations between multiple named entities, such as whether a person works for a particular company.

An information extraction agent may use an opinion generation algorithm to generate an opinion associated with a given predicate. For example, the extraction may extract information related to a technical paper from multiple on-line sources, such as authorship, publication, and other information. The extraction agent could also involve a human participant using a text annotation tool to extract information from a website, text corpus, or other sources.

In some systems, the agent systems could correspond to human users participating in a user-driven item-filtering application, such as restaurant rating or product review websites. Predicates in this context may include statements related to the various types of utility of an item, such as, the affordability of a restaurant or durability of a product. In light of the potential for varying opinions among agents, agent opinions expressed in relation to a predicate may be merged to obtain a global consensus associated with the predicate. The opinion reconciliation system 130 and/or the publisher 120 may use the global consensus to identify the top items (e.g., top rated relative to the global consensus). These top items may be displayed on a website or otherwise communicated to the participating agents by the publisher 120.

The agent systems 110 may generate different, and sometimes inconsistent, opinions in relation to the same predicate. Information extracted by an extraction agent may include conflicting facts in relation to, for example, the authorship of an academic article. Opinions generated by human agents may also vary significantly. The opinion reconciliation system 130 reconciles the opinions and other information associated with each predicate to generate a truth score for each predicate. The truth score may be, as examples, a truth score or a global consensus, associated with the corresponding predicate. A truth score may be associated with predicates for which there is a truth, such as if the predicate related to the authorship of an article. A global consensus may be associated with predicates for which there may not be an absolute truth, such as predicates of a subject nature. For example, a global consensus may be generated for opinions related to movie ratings, approval of a politician, or other such predicates. The truth score associated with each predicate provides users with a reliable composite or aggregate of the opinions associated with the corresponding predicate.

In some systems, additional information for interpreting the opinions may be available. If it is known a priori that an agent always makes explicit opinions about predicates when the opinion is positive, then the opinion reconciliation system 130 may infer that opinions not observed by the agent are negative. For example, if users are observed to provide ratings of all the restaurants they like and are known to have information about all the restaurants, then the opinion reconciliation system 130 may infer that the restaurants not rated are not liked by the user. If the information indicating whether users have information about all the restaurants is not available, the opinion reconciliation system 130 may include a probability that a user has visited a restaurant to infer a user's implicit opinion about the restaurant. The probability that a user has visited a restaurant may be an a priori probability of observation associated with each opinion. When the a priori probability of observation for an opinion is 1, for example, then the opinion is assumed to take certain default value depending on the application; and when the a priori probability of observation is 0, then the opinion may be assumed to be unknown.

The opinion reconciliation system 130 may use a probabilistic model to generate the truth score associated with each predicate that accounts for agent bias, disingenuous opinions, trustworthiness of opinions, characteristics of the agent, and/or other relevant factors. The opinion reconciliation system 130 may also generate an opinion predictiveness score associated with each opinion, as well as infer latent characteristics of each of the agent systems 110.

The probabilistic model may be defined by a set of variables and relationships between the variables. The opinion reconciliation system 130 may use a maximum likelihood technique to estimate any unknown or latent parameters or variables of the model based on the observed or known variables and the defined relationships between the variables in the model. The truth score may be one of the latent parameters estimated by the opinion reconciliation system 130 given the observed variables.

The observed variables may include an agent id, a predicate id, and opinion scores. Each opinion score may be generated by an agent in relation to a predicate. Each opinion score may accordingly be associated with an agent-predicate pair. The agent id may identify the agent. The predicate id may identify the predicate.

The opinion reconciliation system 130 may adapt to new opinions as they are generated and received. The opinion reconciliation system may also update the model at regular time intervals, such as each night based on the opinions received the preceding day or each weekend based on the opinions received during the preceding week.

The opinion reconciliation system 130 may provide the truth score, opinion predictiveness score, or estimated or observed variables to the publisher 120 via the communications network 140. The publisher 120 may display or otherwise provide the agent systems 110 with access to truth scores or other parameters generated by the opinion reconciliation system 130. The publisher 120 may provide a versatile opinion and predicate hosting model using the truth score associated with each predicate, opinion predictiveness associated with each opinion, and/or parameters generated by the opinion reconciliation system 130. The publisher 120 may be configured, for example, to not publish opinions whose trustworthiness score is below a certain threshold.

The components of the architecture 100 may be separate, may be supported on a single server or other network enabled system, or may be supported by any combination of servers or network enabled systems. The components of the architecture 100 may include, or access via the communications network 160, one or more databases for storing data, variables, parameters, statistics, programs, Web pages, search listings, advertising content, or other information related to agent submitted opinions, or other systems.

The communications network 140 may be any private or public communications network or combination of networks. The communications network 140 may be configured to couple one computing device, such as a server, system, database, or other network enabled device, to another device, enabling communication of data between the devices. The communications network 140 may generally be enabled to employ any form of computer-readable media for communicating information from one computing device to another. The communications network 140 may include one or more of a wireless network, a wired network, a local area network (LAN), a wide area network (WAN), a direct connection, such as through a Universal Serial Bus (USB) port, and may include the set of interconnected networks that make up the Internet. The communications network 140 may implement any communication method by which information may travel between computing devices.

Figure 2:
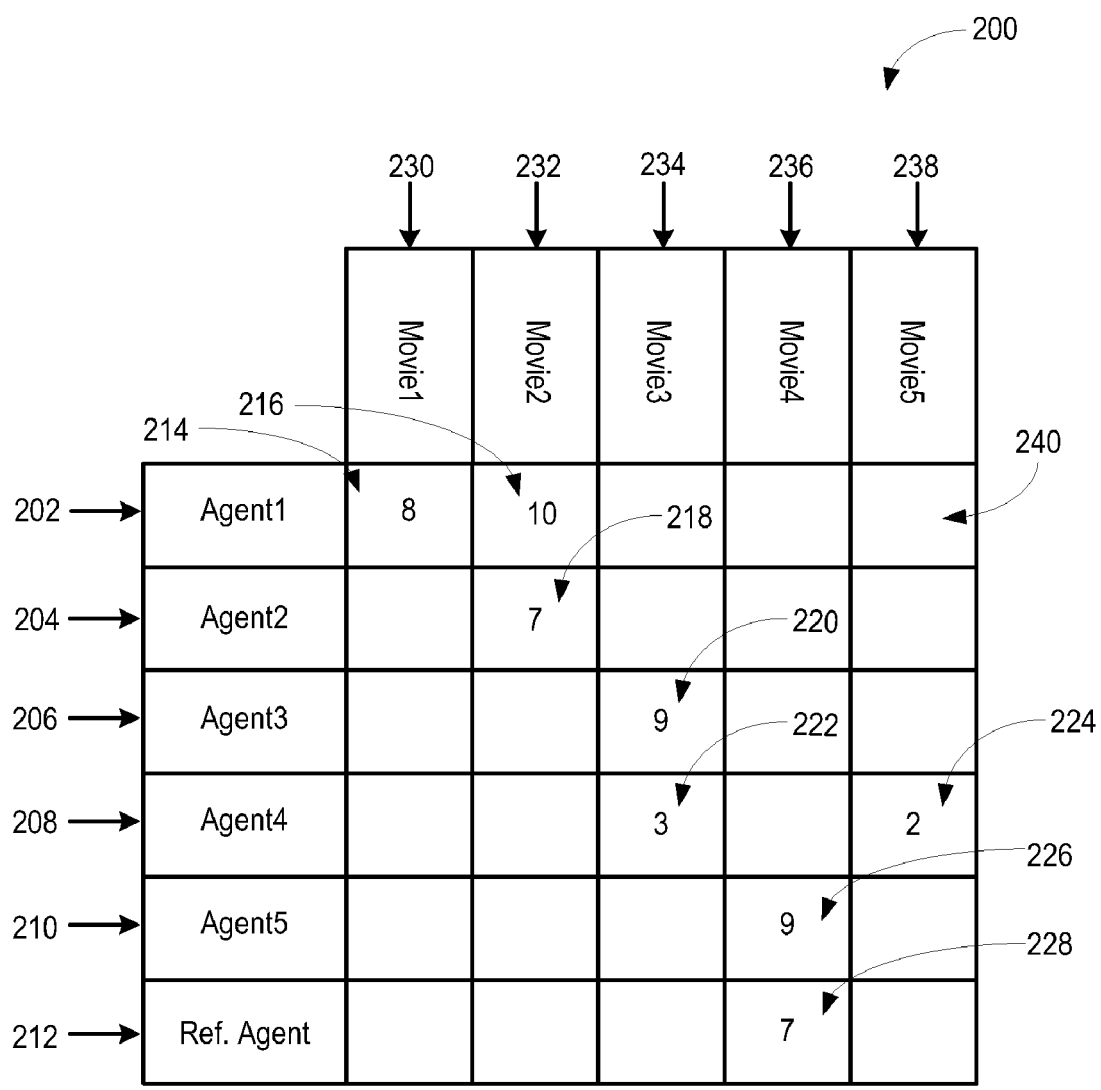
FIG. 2 is a chart illustrating an exemplary relationship between agents, opinions, and predicates with respect to a movie rating system.

FIG. 2 is a chart 200 illustrating an exemplary relationship between agents 202-212, opinions 214-228, and predicates 230-238 in the context of a movie rating system. The predicates 230-238 relate to specific movies and the opinions 214-228 are numerical values between one (1) and ten (10) expressed by the agents 202-212 to rate the movies. The predicates 230-238 may alternatively relate to sports, science, politics, religion, or other topics. The opinions 214-228 may be expressed with a variety of data types, including real, categorical, binary, integral, and other data types. Each agent 202-212 may not express an opinion in relation to each available predicate 230-238. For example, blank entry 240 shows that Agent1 202 did not provide an opinion about Movie5 238.

The agents 202-210 may be, for example, subscribers to a Web site, data base or other information resource that enables subscribers to rate movies. An opinion 228 expressed by a reference agent 212 is also shown. The reference agent's opinion may be treated as a known truth score for the corresponding predicate. Thus, for example, the reference agent's opinion 228 with respect to Movie4 236 may be treated as a known truth score. The reference agent 212 may be a movie critic or other agent with particular knowledge or expertise in relation to movies or entertainment. The reference agent 212 may also be an administrator of the Web site that receives and/or publishes the agent generated opinions. The reference agent 212 may designate a subscriber as a reference agent, such as a subscriber whose past opinions have been shown to be trustworthy and highly predictive of the truth score.

Figure 3:
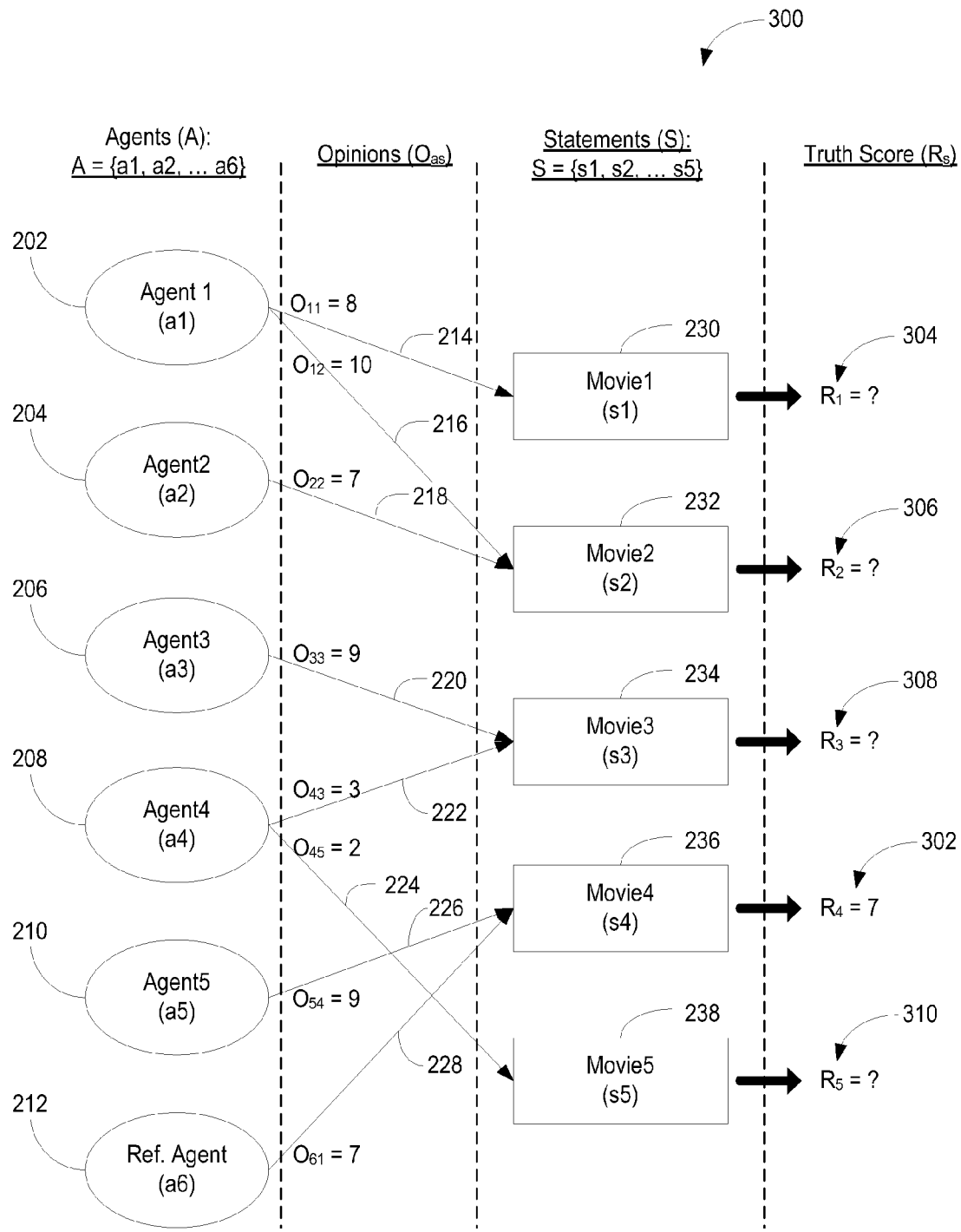
FIG. 3 is a flow diagram illustrating the relationship between an opinion generated by a reference agent and a known truth score.

FIG. 3 is a flow diagram 300 illustrating the relationship between an opinion 228 generated by a reference agent 212 and a known truth score 302. The flow diagram 300 further illustrates the relationship between the agents 202-212, opinions 214-228, and predicates 230-238 represented in FIG. 2 and a truth score associated with each predicate 214-222. The agents 202-212 generate opinions 214-228 with respect to predicates 230-238. In particular, the reference agent 212 generates opinion of seven (7) with respect to Movie4 236. The reference agent's opinion 228 may be designated as a known truth score 302. The truth scores 304-310 associated with predicates 230, 232, 234, 238 are latent parameters to be estimated by an opinion reconciliation system given any observed variables, including the known truth score 302, of the model.

Figure 4:
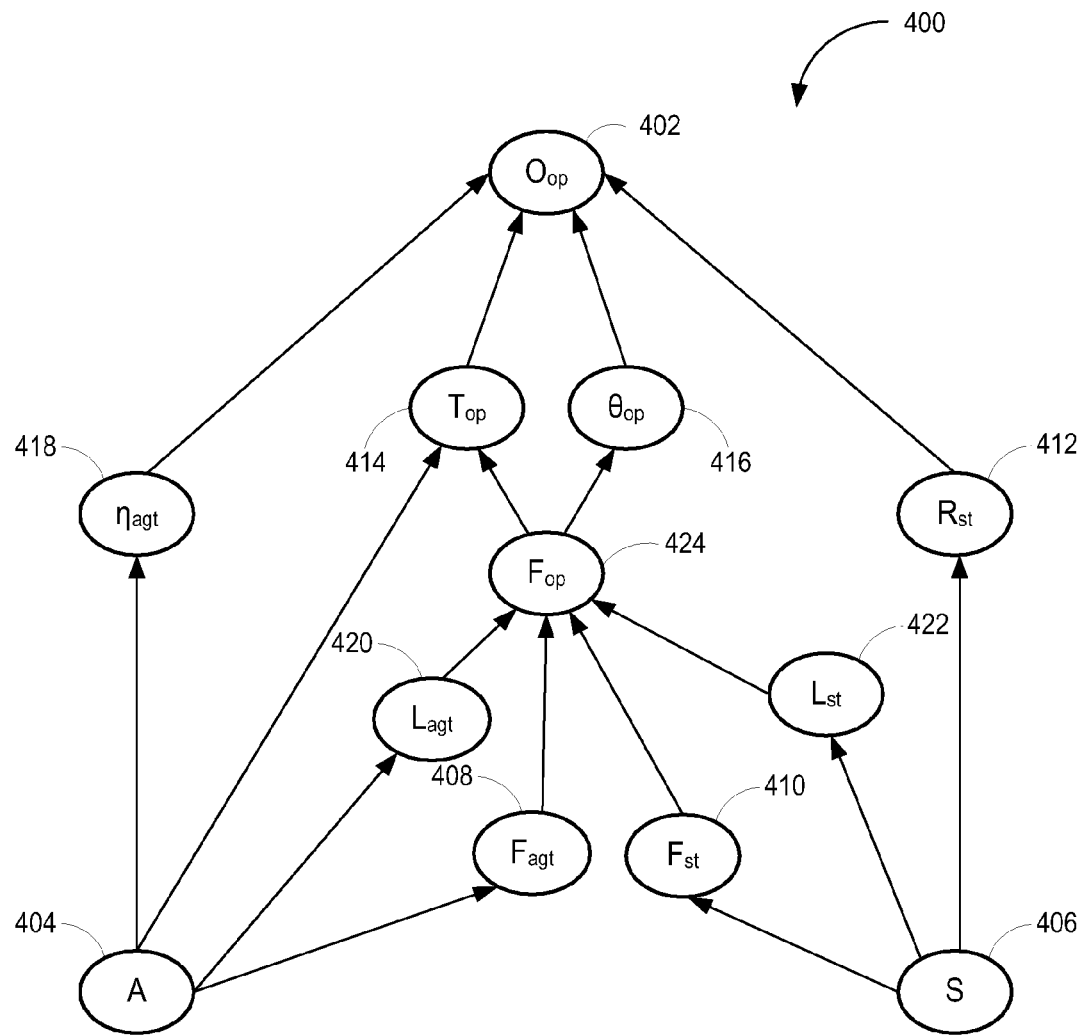
FIG. 4 shows an exemplary graphical model that represents a set of parameters and their probabilistic independencies that the opinion reconciliation system may use to generate a truth score associated with a predicate.

FIG. 4 shows an exemplary graphical model 400 that represents a set of parameters and their probabilistic independencies that the opinion reconciliation system 130 may use to generate a truth score associated with a predicate. The system may follow the general framework of a Bayesian system or other probabilistic models. The model 400 includes nodes 402-424 representing model variables and parameters and conditioning arcs representing causal relationships between a parent and child nodes, the arrowhead end of a conditioning arc pointing to a child node. The nodes 402-424 of the model 400 may correspond to observed variables or latent parameters. The latent parameters may be estimated or inferred based on the observed variables in light of the relationships between nodes.

Nodes 402-410, may correspond to observed variables $O_{op}$, S, A, $F_{agt}$, and $F_{st}$, respectively, of the model 400. The variable $O_{op}$ (node 402) represents opinion scores generated by agents in regards to predicates. Each instantiation of an opinion score variable $O_{op}$ may represent an opinion generated by an agent. The variables A (node 404) and S (node 406) represent agent ids and predicate ids, respectively. The agent id A may takes a value in the range 1 to n, where n is the number of agents. The predicate id S may take a value in the range 1 to m, where m is the number of predicates. A predicate may be a Boolean predicate. The observed variables may be retrieved from a database, directly submitted to an opinion reconciliation system, extracted from other Web sites or sources, or obtained using other information retrieval and/or extraction mechanisms.

The variable $O_{op}$ corresponds to opinion scores generated by the agent associated with the agent id A in regards to the predicate associated with the predicate id S. The opinion score $O_{op}$ may be of a binary type, such as where the opinions generated by the agents represented by the agent data A comprising a "yes" or "no", "thumbs up" or "thumbs down", "1" or "0", or another binary classification. The opinion score $O_{op}$ may be of other data types, such as a real, categorical, integral, or other data types. Real data types may relate to opinions generated from a numerical range of values, such as between zero (0) and one (1), one (1) and ten (10), negative five (−5) to positive five (5), or other ranges. A categorical data type may include opinions generated from a set of predefined categories, such as where the agent opinion is either "good", "average", or "bad," or "yes", "maybe", or no.

The observed variables $F_{agt}$ and $F_{st}$ correspond to observed characteristics of the agent and of the predicate, respectively. The observed agent characteristics $F_{agt}$ (node 408) may include a vector of data representing a set of one or more observed characteristics of the agent associated with the agent id A. The observed agent characteristics $F_{agt}$ may include the agent's expertise, geographic location, age, gender, and/or data representing known, observed, or measured characteristics of the agent. Information related to the agent's profession, geographic location, age, gender, etc. may be obtained from a user profile or other sources. Information related to the agent's geographic location may also be identified by analyzing the IP address, implementing a geo-coding technique, or by other geographic locating methods. Where an agent is an extraction agent, the observed agent characteristics $F_{agt}$ may include the type and properties of extraction mechanism used by the extraction agent and training examples used for fine-tuning the mechanism.

The observed predicate characteristics $F_{st}$ (node 410) may include a vector set of data representing a set of one or more observed characteristics of each predicate corresponding to a predicate id S. The variable $F_{st}$ may include data indicating the topic to which the predicate pertains. For example, $F_{st}$ may indicate that the predicate relates to entertainment, sports, politics, or another topic. The predicate may be a stating predicate, such as an extracted predicate asserting that an information source states some factual information. In context of a stating predicate, the observed predicate characteristics $F_{st}$ may include data about the web site, search engine, or other information source from which the predicate was extracted.

The observed predicate characteristics $F_{st}$ may also include the types of named entities and/or relationships between named entities associated with the predicate. For example, $F_{st}$ may indicate that the predicate pertains to a familial relationships between two persons, or a membership relationship between a person and an organization.

The observed variables may also include a known truth score $R_{st}$ (node 412) associated with one or more of the predicates identified by a predicate id S. The known truth score $R_{st}$ may be known less than all of the predicates. A known truth score may not be known for any of the predicates. For any given predicate identified by a predicate id S, the corresponding truth score $R_{st}$ may be a numerical value between zero (0) and one (1) and may be interpreted as the probability of the truth of the predicate. An opinion generated by a reference agent or other "oracular" source in regards to a predicate may be designated as a known truth score. For example, if a reference agent generates an opinion with respect to predicates $s_2$ and $s^4$ of the set S, the truth scores corresponding to $r_2$ and $r_4$ of the vector $R_{st}$ may be designated as known truth scores.

The opinion scores $O_{op}$ may be modeled by one or more parametric probability distributions. The probability distribution used to model $O_{op}$ may depend on the type of values $O_{op}$ takes, such as if $O_{op}$ is of a binary, real, categorical, integral, or other data type. If the agent opinions are values are real valued, $O_{op}$ may be modeled in terms of $\eta_{agt}$, $T_{op}$, $\theta_{op}$, and $R_{st}$, by one or more Gaussian distributions. If the agent opinions are values are binary or integer valued, $O_{op}$ may be modeled in terms of Bernoulli and Poisson distributions respectively.

$$O_{op}|\eta_{agt},T_{op},\theta_{op},R_{st} \sim T_{op}P^{predictive}(O_{op};\theta_{op},R_{st})+(1-T_{op})P_{default}(O_{op};\eta_{agt}),$$

where $T_{op}$ (node 414) represents an opinion predictiveness variable, and $\eta_{agt}$ and $\theta_{op}$ are opinion generation parameters associated with a default mode and a predictive mode, respectively. In particular, $\theta_{op}$ represents one or more predictive opinion generation parameters (node 416) associated with the predictive mode and $\eta_{agt}$ represents a default opinion generation parameter (node 418) associated with the default mode.

The opinion predictiveness variable $T_{op}$ represents the trustworthiness of the opinion generated by agent associated with agent id A in relation to the predicate associated with the predicate id S. Accordingly, each opinion predictiveness variable may be associated with an agent-predicate pair. Each value of $T_{op}$ may be between zero (0) and one (1) and indicate the probability that the corresponding agent's opinion will be predictive of the truth score $R_{st}$ of the corresponding predicate. For example, the closer a value of $T_{op}$ is to one (1), the more predictive the opinion may be of the truth score $R_{st}$ associated with the predicate to which the opinion corresponds. The probability distribution above includes a predictive component $Ppredictive(O_{op}; \theta_{op}, R_{st})$ with a prior probability $T_{op}$ and a default component $P^{default}(O_{op}; \eta_{agt})$ with a prior probability $T_{op}$.

The predictive opinion generation parameter $\theta_{op}$ may capture the parametric distortion process that is applied by the agent with agent id A to the truth score $R_{st}$ of a corresponding predicate to generate a predictive opinion. The predictive opinion generation parameter $\theta_{op}$ may include one or more scalar values corresponding to each opinion. For example, $\theta_{op}$ may include one or more of the values $scale_{op}$, $offset_{op}$, and $\sigma_{op}$ for each opinion. In this example, the predictive component $P^{predictive}(O_{op}; \theta_{op}, R_{st})$ of $O_{op}$ may correspond to a stochastic linear transformation of the truth score $R_{st}$ with Gaussian noise $$P^{predictive}(O_{op};\theta_{op},R_{st})=N(O_{op};scale_{op}R_{st}+offset_{op},\sigma_{op}^2),$$

where N(;) indicates a univariate Gaussian distribution. The scalars $scale_{op}$ and $offset_{op}$ may scale and shift the truth score $R_{st}$, respectively, to match the data format in which the opinions are generated by the agents. For example, where the truth score values $R_{st}$ are expressed between zero (0) and one (1) and the agent opinions $O_{op}$ are expressed as a number between negative five (−5) and positive five (5), $scale_{op}$ may equal ten (10) and $offset_{op}$ may equal negative five (−5), such that a negative five (−5) opinion corresponds to a truth score of zero (0) and a positive five opinion (5) corresponds to a truth score of one (1). The scalar value $O_{op}$ corresponds to a variance factor adjust predictive component of $O_{op}$ for agent bias.

The default opinion generation parameter $\eta_{agt}$ may capture the parametric opinion generation process in the default mode. The parameter $\eta_{agt}$ may represent the mean prediction of an agent's default response. The default opinion generation parameter $\eta_{agt}$ may also include one or more scalar values corresponding to each agent. For example, $\eta_{agt}$ may include one or more of $scale_{agt}$, $offset^{agt}$, and $\sigma_{agt}$ for each agent.

A Bernoulli distribution may be used to model $O_{op}$ where the agent opinions are of a binary data type, such as a "yes" or "no". A multinomial distribution may be used for opinions of a categorical data type. For example, where opinions associated with a predicate are of one of a set number of categories, such as one of "good," "average," or "bad," a multinomial distribution may be used to model $O_{op}$. For opinions that are of an integral data type, a multinomial or Poisson distributions may be used.

Based on the observed variables of the model 400, the latent parameters may be estimated. Nodes 412-424 may correspond to the latent parameters. The latent parameters may include $\eta_{agt}$, $\theta_{op}$, $T_{op}$, and the truth score $R_{st}$ associated with each predicate. Latent parameters may also include latent agent characteristics $L_{agt}$ (node 420), latent predicate characteristics $L_{agt}$ (node 422), and interaction features $F_{op}$ (node 424).

The truth score $R_{st}$ (node 412) may be correspond to an aggregate of weighted opinions, such as by the following equation:

$$R_{st}=\Sigma H_{op}O_{op},$$

where $H_{op}$ represents a posteriori predictiveness of the opinion score $O_{op}$ which may be uniquely determined in terms of the opinion score $O_{op}$, and the default opinion generation parameter $\eta_{agt}$, the predictive opinion generation parameter $\theta_{op}$, and the opinion predictiveness $T_{op}$.

The opinion predictiveness variable $T_{op}$ may include a vector of numerical values associated with each opinion. Each value of $T^{op}$ may be between zero (0) and one (1) and indicate the probability that the agent's opinion will be predictive of the truth score $R_{st}$ of the corresponding predicate. The opinion predictiveness $T_{op}$ may determine a weighting for the predictive and default components of the model 400. The opinion predictiveness $T_{op}$ may depend on the interaction features $F_{op}$ and may be modeled with a Beta distribution: $T_{op} \sim \text{Beta}(T_{op}; \exp(\beta^T F_{op}), 1)$, where $\beta$, a coefficient of interaction features, is an unknown parameter of the model 400.

The interaction features $F^{op}$ may be a vector set of one or more parameters associated with each agent-predicate pair. For example, $F_{op}$ may be represented as $F_{op} = [F_{agt}; F_{st}; \text{reshape}(F_{agt} F_{st}^T); \text{reshape}(L_{agt} L_{st}^T)]$, where $F_{agt} F_{st}^T$ and $L_{agt} L_{st}^T$ capture correlations between the observed and latent agent and predicate characteristics respectively, and where reshape( ) may transform a two dimensional matrix into a 1-dimensional vector. The interaction features $F_{op}$ for each agent predicate pair may contribute to the determination of whether an agent's opinion about a predicate is predictive of the truth score $R_{st}$, or a default opinion expressed by the agent. The interaction features $F_{op}$ may indicate, for example, a relative amount of interaction or relatedness between the agent and the predicate.

The interaction features $F_{op}$ may include data indicating whether the topic associated with the predicate is related to the agent's area of expertise. If the interaction features $F_{op}$ for an agent-predicate pair indicate that the agent's expertise relates to the topic of the predicate (such as if a movie critic is rating a movie), the agent's opinion may more likely be predictive of the truth score $R_{st}$. Consideration of any relatedness or interaction between agent and predicate may contribute to a reliable and accurate determination of the opinion predictiveness $\alpha_{op}$, which in turn contributes to a reliable and accurate weighting the default and predictive components of $O_{op}$.

The interaction features $F_{op}$ may depend on latent agent characteristics $L_{agt}$ and latent predicate characteristics $L_{st}$. The latent agent characteristics $L_{agt}$ may be a vector set of unknown variables about the agent associated with agent id A. The latent predicate characteristics $L_{st}$ may be a vector set of unknown variables about the predicate associated with predicated id S.

The latent agent characteristics $L_{agt}$ and the latent predicate characteristics $L_{st}$ may be obtained using one or more discrete and continuous latent factor models. For example, the latent agent or predicate characteristics may represent membership (0 or 1) in (unknown) groups of agents or predicates, respectively, that share homogeneous behavior with respect to opinion predictiveness or the parametric distortion process. These latent characteristics may be learned using bi-clustering algorithms that simultaneously cluster the agents and the predicates. The bi-clustering algorithms may also be used to identify important properties of the resulting clusters of agents and predicates.

Predictive latent characteristics may be learned weighted low rank matrix factorization of the observed opinions. The resulting factors may capture principal aspects of the opinion predictiveness and opinion generation. In this context, the latent agent characteristics may be viewed as the projections of the agent's opinion profile along each of the discovered factors. The latent predicate characteristics may be similarly interpreted. The bi-clustering and weighted low rank factorization algorithms for discovering latent agent and predicate characteristics are exemplary and may be used in various configurations as components of a larger learning algorithm.

As noted above, the default and predictive opinion generation parameters $\eta_{agt}$ and $\theta_{op}$ may include scale, offset and/or variance components. The scale, offset and/or variance components of the default and predictive may be estimated with the maximum likelihood technique used to estimate the latent parameters of the model 400.

The graphical model 400 and the equations identified above are exemplary in nature. The graphical model 400 illustrates a bi-modal approach that includes a default mode and predictive mode. Other configurations of the variables and parameters may be used, including configurations with only a predictive mode in which the truth score $O_{op}$ may be modeled in terms of the predictive opinion generation parameter $\theta_{op}$, the truth score $R_{st}$, and the opinion predictiveness $T_{op}$. Other exemplary graphical models may use more or less parameters than the variables and parameters represented in the graphical model 400. In another exemplary graphical model, the opinion predictiveness $T_{op}$ may be a property associated with an agent trustworthiness, i.e., $T_{op} = T_{agt}$ and may be used to weight the predictive and default components of the probability distribution used to model $O_{op}$:

$$O_{op} | \eta_{agt}, T_{agt}, \theta_{op}, R_{st} \sim T_{agt} P^{predictive}(O_{op}; \theta_{op}, R_{st}) + (1 - T_{agt}) P_{default}(O_{op}; \eta_{agt}).$$

Figure 5:
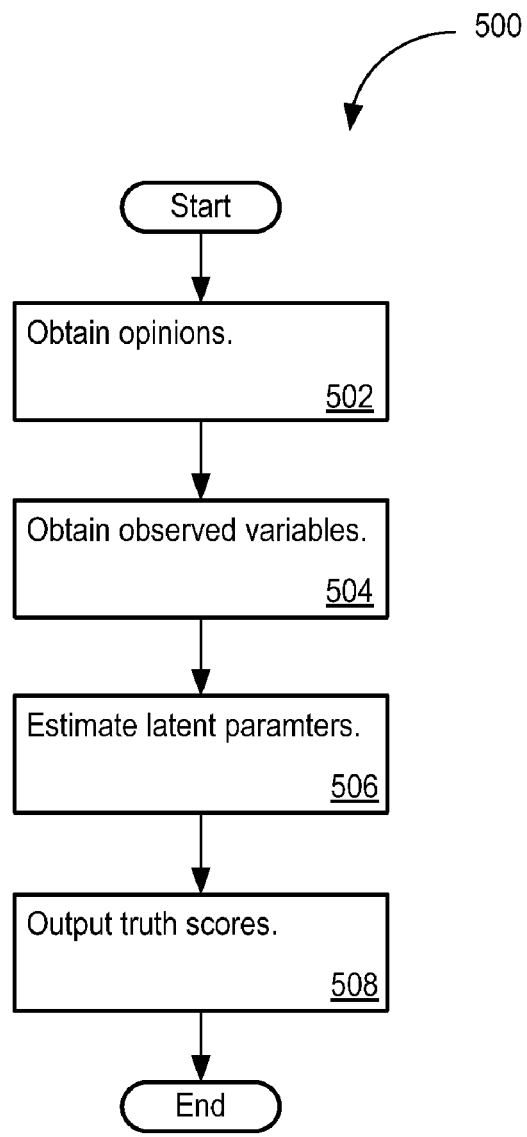
FIG. 5 illustrates an exemplary process that may be used to reconcile agent submitted opinions.

FIG. 5 illustrates an exemplary process 500 that may be used to reconcile agent submitted opinions in a system for opinion reconciliation, such as the opinion reconciliation system 130. The process 500 obtains opinions generated by one or more agents (Act 502). The opinions generated by the agents may be stored in and accessed from a database. The opinions may be extracted using an information extraction technique from one or more Web sites that host agent generated opinions. The opinions may be generated and submitted by human agents.

The process 500 obtains observed variables (Act 504). The process 500 may also identify a set of observed agent and predicate characteristics and obtain the identified observed characteristics. The process 500 may also set a size (e.g., number of latent features) of the latent agent and predicate characteristics vectors. The observed variables may be retrieved from a database, directly submitted by and received from an agent, extracted from other Web sites or sources, or obtained using other information retrieval and/or extraction mechanisms.

The process 500 estimates the value of any latent or unknown parameters (Act 506). The latent parameters may be part of a probabilistic model used in estimating the latent parameters based on the observed variables. The latent parameters may include a truth score associated with one or more of the predicates. The latent parameters may also include an opinion predictiveness associated with each opinion. The process 500 may use a generalized Expectation-Minimization (generalized EM) algorithm or other maximum likelihood technique to estimate the latent parameters.

The generalized EM algorithm may include iterations over multiple expectation and maximization steps dealing with sets and subsets of latent parameters. In each step, parameters in a set or subset of the parameters are assumed to be fixed and the likelihood function or an equivalent free energy function is maximized with respect to the remaining parameters. The process 500 may use multiple runs of the generalized EM algorithm or variants in conjugation with smoothing techniques, such as deterministic annealing.

The process 500 outputs the truth score associated one or more of the predicates (Act 508). The process 500 may output the truth score to a publisher, Web page, or other system to associate the truth score with the corresponding predicate.

The truth score represents an accurate an reliable synthesis of multiple, and potentially different and/or conflicting, opinions associated with a predicate.

As new opinions are generated and received, the process 500 may obtain new observed variables and estimate the latent parameters to update the probabilistic model. The process 500 may update the model at a regular and/or pre-set time interval. The process 500 may also update the model as new opinions are received.

The disclosed methods, processes, programs, and/or instructions may be encoded in a signal-bearing medium, a computer-readable medium such as a memory, programmed within a device such as on one or more integrated circuits, or processed by a controller or a computer. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as that occurring through an analog electrical, audio, or video signal. The software may be embodied in any computer-readable or signal-bearing medium, for use by, or in connection with, an instruction executable system, apparatus, or device. Such a system may include a computer-based system, a processor-containing system, or another system that may selectively fetch instructions from an instruction executable system, apparatus, or device that may also execute instructions.

Figure 6:
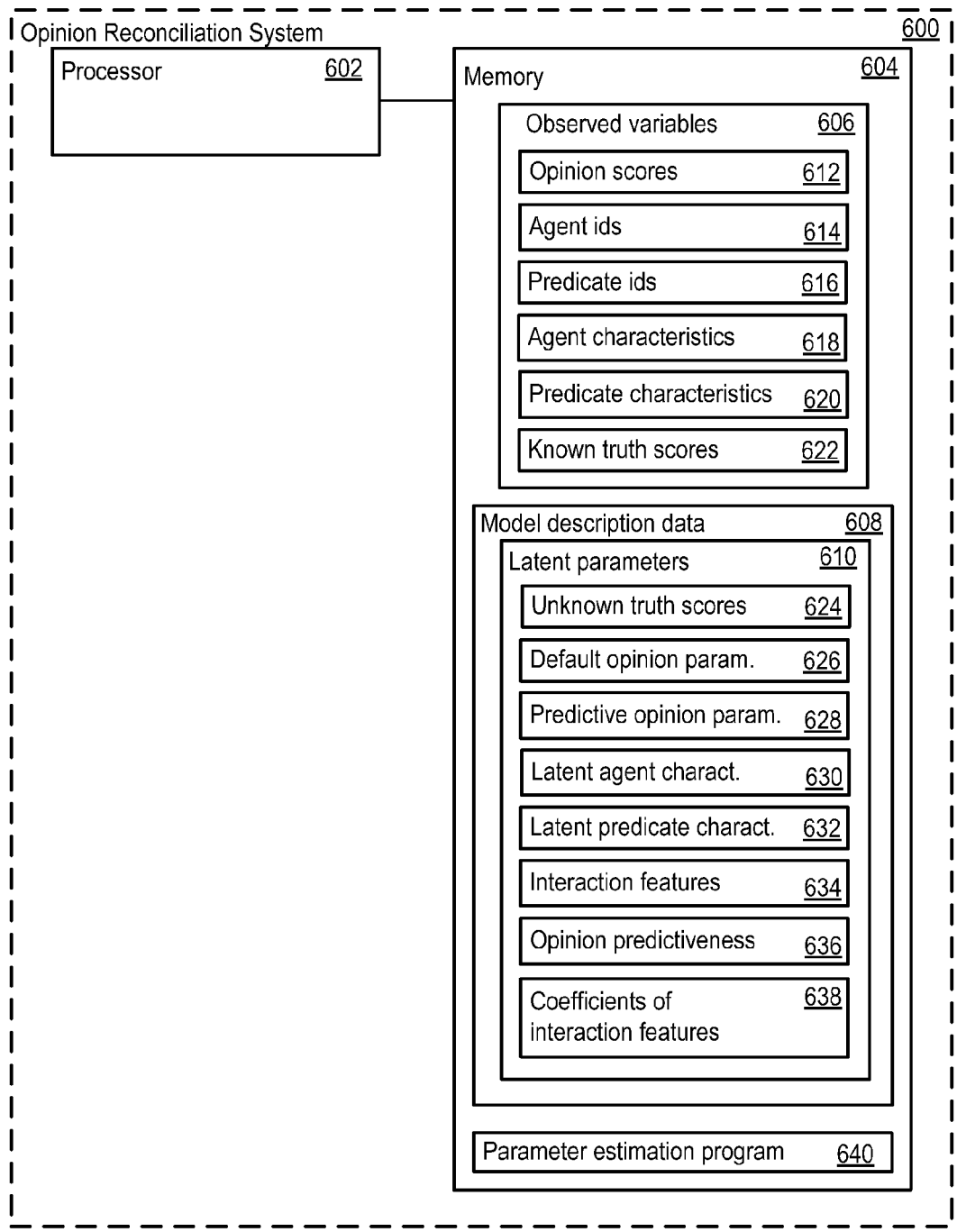
FIG. 6 illustrates a computer system implementing an opinion reconciliation system.

FIG. 6 illustrates a computer system implementing an opinion reconciliation system 600, including a processor 602 coupled to a memory 604. The processor 602 may execute instructions stored on the memory 604 to reconcile opinions generated by one or more agents about one or more predicates.

The memory 604 may store observed variables 606 and a model description 608 that defines one or more probabilistic models including latent parameters 610, such as the probabilistic model 400, used to estimate a truth score associated with each predicate. The model description data 608 may define the latent parameters 610, as well as independencies between the observed variables 606 and the latent parameters 610 of the probabilistic model.

The observed variables 606 may include opinion scores 612, an agent id associated with each agent 614, a predicate id associated with each predicate 616, observed agent characteristics 618, and observed predicate characteristics 620. The observed variables 606 may also include any known truth scores 622 associated with one or more of the predicates. An opinion submitted by a reference agent may be designated as a known truth score 622 and stored on the memory 604. One or more of the observed variables 606 may be stored on the memory 604.

The opinion scores 612 may correspond to opinions generated by agents about predicates. The agent ids 614 may identify or reference each of the agents. The predicate ids 616 may identify or reference each of the predicates. The opinion scores 612, agent ids 614, and predicate ids 616 may be directly saved on the memory 604 by an agent.

The probabilistic model defined by the model description 608 may include the latent parameters 610 to be estimated. Once estimated, one or more of the latent parameters 610 may be stored on the memory 604. The latent parameters 610 may include unknown truth scores 624 associated with the predicates represented by the predicate ids 616. The latent parameters 610 may include default and predictive opinion generation parameters 626 and 628. FIG. 6 shows an exemplary system that implements a bi-modal approach to reconciling opinions that includes a default opinion generation parameter and a predictive opinion generation parameter. In an alternative system, the latent parameters 610 may include just a predictive opinion generation parameter 628, in which the opinion scores 612 may be modeled in terms of the truth score 624, opinion predictiveness score 636, and the predictive opinion generation parameter 628.

The latent parameters 610 may include latent agent characteristics 630 and latent predicate characteristics 632. The latent parameters 610 may also include interaction features 634, an opinion predictiveness score 636 associated with each opinion, and a coefficient of the interaction features 638.

The model description 608 may define the relationships between the observed variables 606 and latent parameters 610 of the probabilistic model. The relationships between variables and parameters may include information related to dependencies between parameters of the model. The dependencies between related parameters may be modeled by one or more probability distributions, as explained above with respect to FIG. 4.

The processor 602 may execute a parameter estimation program 640 stored on the memory 604 to estimate the latent parameters 624 given the model description 608 and observed variables 606. The parameter estimation program 640 may use a generalized EM algorithm, or other maximum likelihood technique to estimate the latent parameters 610. Once estimated, the processor 602 may execute instructions stored on the memory 604 to store one or more of the latent parameters 610 on the memory 604.

The processor 602 may also execute instructions stored on the memory 604 to output one or more of the estimated latent parameters 610 or observed variables 606. The truth scores estimated by the parameter estimation program 640 and associated with the predicates represented by the predicate ids 616 may be provided to a publisher, or displayed to users, to provide useful and reliable information as to the truth of the corresponding predicate. The opinion predictiveness scores 636 estimated by the parameter estimation program 640 may be useful to identify and/or filter out any untrustworthy opinion, such as any opinions that cannot be reliably relied upon. The opinion predictiveness scores 636 may also be used to identify highly reliable opinions and/or agents. The opinion reconciliation system 600 may, for example, identify an opinion, and agent that generated the opinion, whose corresponding opinion predictiveness score 636 exceeds some threshold. The so identified agent may be designated as a reference agent.

The opinion reconciliation system 600 may continue to receive and store on the memory 604 new opinion scores 612 generated by new or old agents in regards to new or old predicates. The opinion scores 612 may be received as they are submitted, periodically, or in other time intervals. As new opinion scores 612 are received, the opinion reconciliation system 600 may update the observed variables 606 according to the new opinion scores. The opinion scores 612 may be updated to include and/or reference the new opinion scores. The agent and/or predicate ids 614 and 616 may be updated to reference any new agents submitting opinions and/or predicates.

The observed agent and predicate characteristics 618 and 620 may also be updated as new opinions are received. The updated observed agent characteristics 618 may relate to existing agents represented by the agent ids 614, such as new information learned about an agent. The updated observed agent characteristics 618 may also include information observed in relation to new agents represented in the updated agent ids 614. The updated observed agent characteristics may include expertise, gender, geographic location, or other information observed or known about the new agent. The updated observed predicate characteristics 618 may relate to existing or new predicates.

Based on the updated observed variables 606, the opinion reconciliation system 600 may update the latent parameters 610 in light of the updated observed variables 606 using parameter estimation program 640. The system 600 may update the observed variables substantially continuously as new opinion scores are received and then estimate the latent parameters 610 in light of the updated observed variables. As an alternative, the system 600 may update the observed variables at regular intervals. For example, the system 600 may initially store data associated with newly received opinion scores on a memory separate from the memory 604, or in another location on the memory 604. At regular time intervals, such as every night or weekend, the system 600 may update the observed variables received over the previous day or week and then update the latent parameters 610 using the parameters estimation program 640.

From the foregoing, it may be seen that an opinion reconciliation system may provide an improved and more reliable determination of the truth score of a predicate. The truth score may enable a publisher or other system to determine and/or display to a user, with improved confidence, the truth of a particular predicate about which one or more agents have expressed potentially differing opinions.

Although selected aspects, features, or components of the implementations are depicted as being stored in memories, all or part of the systems, including the methods and/or instructions for performing such methods consistent with the opinion reconciliation system, may be stored on, distributed across, or read from other computer-readable media, for example, secondary storage devices such as hard disks, floppy disks, and CD-ROMs; a signal received from a network; or other forms of ROM or RAM either currently known or later developed.

Specific components of the opinion reconciliation system may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, (e.g., latent agent characteristics, opinion predictiveness, etc.), databases, and other data structures may be separately stored and managed, may be incorporated into a single memory or database, or may be logically and physically organized in many different ways. Programs or instruction sets may be parts of a single program, separate programs, or distributed across several memories and processors.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The computer-readable medium may selectively be, but is not limited to, an electronic, magnetic, optical, electromagnetic, infrared, or semiconductor system, apparatus, device, or propagation medium. A non-exhaustive list of examples of a machine-readable medium may include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A computer-readable medium may also include a tangible medium upon which software is printed, as the software may be electronically stored as an image or in another format (e.g., through an optical scan), then compiled, and/or interpreted, or otherwise processed. The processed medium may then be stored in a computer and/or machine memory.

While various embodiments of the invention have been described, it will be apparent to those of ordinary skill in the art that many more embodiments and implementations may be possible within the scope of the invention. Accordingly, the invention is not to be restricted except in light of the attached claims and their equivalents.

The invention claimed is:

1. A computerized system apparatus for reconciling opinions generated by one or more agents in relation to a predicate, comprising:
    a processor; and
    a memory coupled with the processor, the memory comprising:
        observed variables comprising:
            opinion scores, each opinion score being associated one of the opinions generated by the one or more agents in relation to the predicate;
            an agent id associated with each of the one or more agents;
            a predicate id associated with the predicate;
            an observed agent characteristic associated with each agent; and
            an observed predicate characteristic associated with each predicate;
        a probabilistic model comprising latent parameters, the latent parameters comprising:
            a truth score associated with the predicate; and
            an opinion predictiveness score associated with each of the opinions; and
        instructions that, when executed, cause the processor to:
            estimate the latent parameters based on the observed variables using a maximum likelihood technique; and
            output the truth score associated with the predicate.

2. The system of claim 1, where the predicate comprises statements related to attributes of a named entity or relations between multiple named entities.

3. The system of claim 1, where the maximum likelihood technique comprises using a generalized EM algorithm.

4. The system of claim 1, where the predicate comprises statements related to a correctness of an answer generated by an agent with respect to a question.

5. The system of claim 1, where the agents comprise human participants in a user-driven item-filtering application.

6. The system of claim 1, where the observed variables further comprise a priori probabilities of observation associated with each opinion.

7. The system of claim 1, where the latent parameters further comprise:
    latent agent characteristics;
    latent predicate characteristics;
    coefficients of interaction features; and
    interaction features modeled in terms of the latent agent characteristics, the latent predicate characteristics, the coefficients of interaction features, the observed agent characteristics, and the observed predicate characteristics.

8. The system of claim 7, where the instructions that, when executed, cause the processor to estimate the latent parameters comprise instructions that, when executed, cause the processor to estimate the latent agent and latent predicate characteristics using at least one of a bi-clustering technique and a low rank factorization technique.

9. The system of claim 7, where each opinion predictiveness score associated with one of the opinions is modeled with a beta distribution in terms of the interaction features and the coefficients of the interaction features.

10. The system of claim 1, where each opinion score is modeled in terms of a parametric distortion process applied to the truth score associated with the predicate, where the parametric distortion process is modeled in terms of a scale, offset, and variance variable, and where the memory further comprises instructions that, when executed, cause the processor to estimate the scale, the offset, and the variance variable based on the observed variables.

11. The system of claim 1, where the probabilistic model comprises a bi-modal model comprising:
    a default mode associated with a default opinion generation parameter; and
    a predictive mode associated with a predictive opinion generation parameter;
    where the default and predictive opinion generation parameters are latent parameters of the probabilistic model;
    where the opinion scores are modeled in terms of the truth score associated with the predicate; the default opinion generation parameter; the predictive opinion generation parameter; and the opinion predictiveness score associated with each opinion; and
    where the instructions that, when executed, cause the processor to estimate the latent parameters comprise instructions that, when executed, cause the processor to estimate the default opinion generation parameter and the predictive opinion generation parameter based on the observed variables using the maximum likelihood technique.

12. A computerized process for reconciling opinions generated by one or more agents in relation to a predicate, comprising:
    obtaining observed variables comprising:
        opinion scores, each opinion score being associated with one of the opinions;
        an agent id associated with each of the one or more agents;
        a predicate id associated with the predicate;
        observed agent characteristics associated with each agent; and
        observed predicate characteristics associated with each predicate;
        using the computer to estimate latent parameters of a probabilistic model based on the observed variables using a maximum likelihood technique, where the latent parameters comprise:
        a truth score associated with the predicate; and
        an opinion predictiveness score associated with each of the opinions;
        latent agent characteristics; and
        latent predicate characteristics; and
    outputting the truth score.

13. The process of claim 12, further comprising:
    identifying at least one of the agents as a reference agent; and
    identifying an opinion generated by the reference agent as a known truth score, where observed variables further comprise the known truth score.

14. The process of claim 12, where the each truth score is modeled with a predictive component and a default component, where predictive component is weighted by a weight and the default component is weighted by one minus the weight.

15. The process of claim 14, where the weight comprises the opinion predictiveness score.

16. The process of claim 14, the latent parameters further comprise:
    a predictive opinion generation parameter associated with each opinion; and
    a default opinion generation parameter associated with each agent; and
    where estimating the latent parameters comprises:
    estimating the predictive opinion generation parameter; and
    estimating the default opinion generation parameter.

17. The process of claim 16, where the predictive component is modeled with a Bernoulli distribution in terms of the predictive opinion generation parameter and the truth score associated with the predicate, and where the default component is modeled with a Poisson distribution in terms of the default opinion generation parameter.

18. The process of claim 12, further comprising:
    receive a new opinion score generated by an agent in relation to the predicate;
    updating the observed variables based on the new opinion score;
    estimating the latent parameters based on the updated observed variables to generate an updated truth score associated with the predicate; and
    outputting the updated truth score.

19. A product of manufacture comprising:
    a computer-readable medium; and
    programmable instructions stored on the computer-readable medium that, when executed, cause a processor in an opinion reconciliation system to:
        receive multiple opinions, where each opinion is generated by an agent in relation to a predicate;
        receive observed variables comprising an opinion score associated with each opinion;
        estimate latent parameters of a probabilistic model based on the observed variables and on defined relationships between the latent parameters and the observed variables, where the latent parameters comprise:
        a truth score associated with each predicate;
        latent agent characteristics; and
        latent predicate characteristics; and
        output the truth score associated with each predicate.

20. The product of claim 19, where the latent parameters further comprise an opinion predictiveness score associated with each opinion and the programmable instructions stored on the computer-readable medium, when executed, further cause the processor to output the agent trustworthiness score associated with each opinion.

21. The product of claim 19, where the instructions stored on the computer-readable medium, when executed, further cause the processor to:
    estimate a default opinion generation parameter associated with each agent; and
    estimate a predictive opinion generation parameter associated with each opinion.

22. The product of claim 21, where each opinion score is modeled in terms of the truth score, the default opinion generation parameter, the predictive opinion generation parameter, and an opinion predictiveness score for weighting the default and predictive opinion generation parameters.

23. The product of claim 19, where the truth score associated with the predicate comprises an aggregate of weighted opinion scores generated in relation to the predicate, and where the opinion scores are weighted by a posteriori predictiveness parameter associated with each opinion score.

24. The product of claim 19, where the observed variables further comprise an observed agent characteristic and an observed predicate characteristic;
where the latent parameters further comprise:
interaction features modeled in terms of the observed agent and observed predicate characteristics and the latent agent and latent predicate characteristics; and
coefficients of the interaction features; and
where the opinion predictiveness score is modeled with a beta distribution in terms of the interaction features and the coefficients of the interaction features.

25. The product of claim 19, where the programmable instructions stored on the computer-readable medium, when executed, further cause the processor to:
receive a new opinion score generated by an agent in relation to the predicate;
update the observed variables based on the new opinion score;
estimate the latent parameters based on the updated observed variables to generate an updated truth score associated with the predicate; and
output the updated truth score.

* * * * *